(12) United States Patent
Kabasawa

(10) Patent No.: US 11,620,362 B2
(45) Date of Patent: Apr. 4, 2023

(54) IMAGE FORMING APPARATUS

(71) Applicant: FUJIFILM Business Innovation Corp., Tokyo (JP)

(72) Inventor: Rie Kabasawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/023,333

(22) Filed: Sep. 16, 2020

(65) Prior Publication Data

US 2021/0240800 A1    Aug. 5, 2021

(30) Foreign Application Priority Data

Jan. 30, 2020    (JP) .............................. JP2020-013836

(51) Int. Cl.
    *G06F 21/10*      (2013.01)
    *H04N 1/00*      (2006.01)

(52) U.S. Cl.
    CPC ......... *G06F 21/105* (2013.01); *H04N 1/0049* (2013.01); *H04N 1/00411* (2013.01)

(58) Field of Classification Search
    CPC ... G06F 21/105; G06F 21/10; H04N 1/00411; H04N 1/0049
    See application file for complete search history.

(56) References Cited

U.S. PATENT DOCUMENTS

| | | | | |
|---|---|---|---|---|
| 7,117,443 | B1 * | 10/2006 | Zilka ..................... | G06Q 10/10 715/739 |
| 7,231,438 | B1 * | 6/2007 | Kikuchi ................. | H04L 41/12 709/223 |
| 7,962,424 | B1 * | 6/2011 | Colosso ................. | G06Q 30/06 705/50 |
| 8,111,414 | B2 * | 2/2012 | Sato .................... | H04N 1/00204 358/1.15 |
| 10,021,264 | B2 * | 7/2018 | Watariuchi ......... | H04N 1/00204 |
| 11,061,995 | B2 * | 7/2021 | Sugaya ................. | G06F 21/105 |
| 2004/0024688 | A1 * | 2/2004 | Bi .......................... | G06Q 40/04 705/37 |
| 2006/0106725 | A1 * | 5/2006 | Finley, Jr. ........... | G06F 3/04817 705/59 |
| 2010/0293622 | A1 * | 11/2010 | Nikitin .................... | G06F 21/10 726/31 |
| 2011/0061047 | A1 * | 3/2011 | Tyamagondlu ....... | G06F 21/105 717/177 |
| 2011/0125655 | A1 | 5/2011 | Chiyo et al. | |
| 2012/0064204 | A1 * | 3/2012 | Davila ............... | H04N 1/00188 426/231 |

(Continued)

FOREIGN PATENT DOCUMENTS

JP      5454102      3/2014

*Primary Examiner* — Justin S Lee
(74) *Attorney, Agent, or Firm* — JCIPRNET

(57) ABSTRACT

An image forming apparatus includes an image forming mechanism, a panel serving as a user interface of the image forming mechanism, a receiver that receives an image forming instruction for the image forming mechanism from a user of an information processing apparatus, and a display controller that controls the panel to display, in response to the receiver receiving the image forming instruction, a message about management of a license related to software installed in the information processing apparatus by referring to management information of the software.

14 Claims, 14 Drawing Sheets

(56) References Cited

U.S. PATENT DOCUMENTS

| | | | |
|---|---|---|---|
| 2013/0067463 A1* | 3/2013 | Ito ............................ | G06F 8/60 |
| | | | 717/178 |
| 2013/0185197 A1* | 7/2013 | Brown ................. | G06F 21/105 |
| | | | 705/39 |
| 2013/0222829 A1* | 8/2013 | Nakashima ........ | H04N 1/00233 |
| | | | 358/1.13 |
| 2014/0101720 A1* | 4/2014 | Xie ........................ | H04L 67/36 |
| | | | 726/3 |
| 2014/0122350 A1* | 5/2014 | Takemoto ............ | G06Q 30/018 |
| | | | 705/317 |
| 2014/0173762 A1* | 6/2014 | Sugiura ................. | G06Q 30/00 |
| | | | 726/30 |
| 2015/0248543 A1* | 9/2015 | Yoshinari ............ | G06F 21/6218 |
| | | | 726/28 |
| 2017/0243229 A1* | 8/2017 | Dokai ................. | G06Q 30/018 |

\* cited by examiner

FIG. 6

| SOFTWARE PRODUCT | SUPPORTED | | | UNSUPPORTED | |
|---|---|---|---|---|---|
| | EXPIRY DATE OF SUPPORT | | | EXPIRY DATE OF SUPPORT | |
| XX | 9.0 | 8.0 | 7.0 | 6.0 | 5.0 |
| | 10/1/2024 | 6/1/2022 | 8/1/2020 | 12/1/2019 | 9/1/2018 |
| YY | 2.5 | 2.0 | 1.0 | | |
| | 5/1/2024 | 11/1/2023 | 10/1/2022 | | |

| SOFTWARE PRODUCT | USER | LICENSE | STATUS OF LICENSE |
|---|---|---|---|
| XX | B | 6.0 | EXPIRED |

FIG. 14

| COMPANY NAME | LICENSE | STATUS OF USE | EXPIRY DATE | STATUS OF BILLING | DISPLAY OF MESSAGE 1 | DISPLAY OF MESSAGE 2 |
|---|---|---|---|---|---|---|
| COMPANY C | 9.0 | IN USE | 12/10/2019 | UNPAID FROM DECEMBER 11 | 12/13/2019 | |
| COMPANY D | 8.0 | IN USE | 8/15/2020 | PAID | | |

| SOFTWARE PRODUCT | COMPANY NAME | LICENSE | STATUS OF BILLING |
|---|---|---|---|
| XX | COMPANY C | 9.0 | UNPAID FROM DECEMBER 11 |

IMAGE FORMING APPARATUS

CROSS-REFERENCE TO RELATED APPLICATIONS

This application is based on and claims priority under 35 USC 119 from Japanese Patent Application No. 2020-013836 filed Jan. 30, 2020.

BACKGROUND

(i) Technical Field

The present disclosure relates to an image forming apparatus.

(ii) Related Art

Information processing apparatuses such as a PC may have software whose license is managed. In general, an external license management apparatus transmits a license management message to the information processing apparatus to notify a user of, for example, expiration of the software license.

Japanese Patent No. 5454102 describes license management for software installed in an image forming apparatus such as a printer, a scanner, or a facsimile machine. An intermediary apparatus is provided in a local area network to which a plurality of image forming apparatuses are connected. The intermediary apparatus mediates between an external license management apparatus and the plurality of image forming apparatuses to achieve license renewal or the like.

SUMMARY

Aspects of non-limiting embodiments of the present disclosure relate to the following circumstances. Software license management may partially be performed by using an image forming apparatus provided near an information processing apparatus. In general, the user of the information processing apparatus frequently uses the image forming apparatus for image formation or the like. If the license management is performed via the frequently used image forming apparatus, user's convenience is expected to improve.

It is desirable that a license management message for software being used in the information processing apparatus be sent to a user in a different way from that in a case where the message is sent to the information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising an image forming mechanism, a panel serving as a user interface of the image forming mechanism, a receiver that receives an image forming instruction for the image forming mechanism from a user of an information processing apparatus, and a display controller that controls the panel to display, in response to the receiver receiving the image forming instruction, a message about management of a license related to software installed in the information processing apparatus by referring to management information of the software.

BRIEF DESCRIPTION OF THE DRAWINGS

An exemplary embodiment of the present disclosure will be described in detail based on the following figures, wherein:

FIG. 6 illustrates an example of data about various software products recorded in a support license DB;

FIG. 14 illustrates an example of data about a certain software product recorded in a use license DB;

DETAILED DESCRIPTION

(1) Overview of Information Processing System

Figure 1:
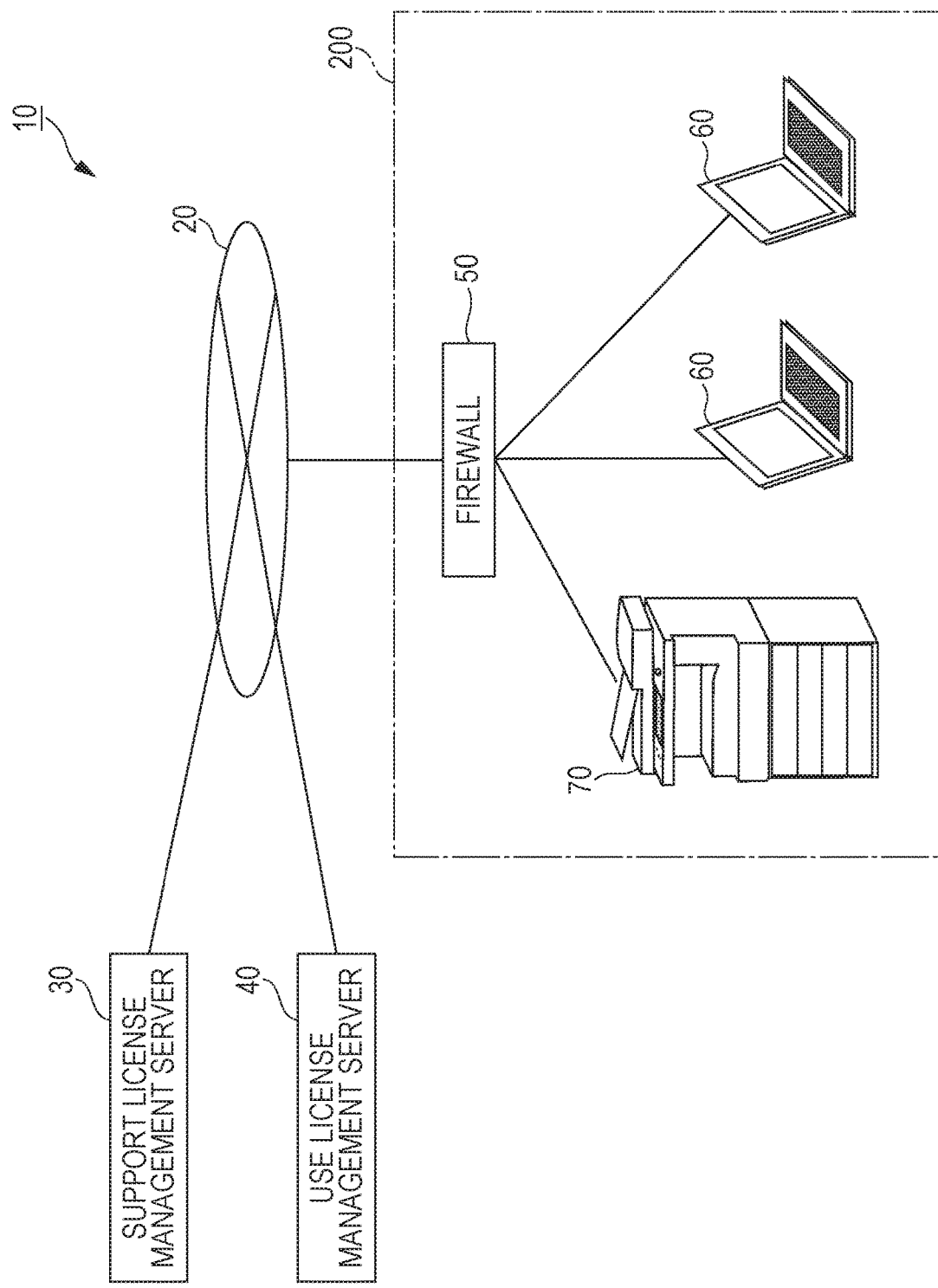
FIG. 1 is a schematic diagram illustrating the configuration of an information processing system according to an exemplary embodiment.

FIG. 1 is a schematic diagram illustrating the configuration of an information processing system 10 according to an exemplary embodiment. The information processing system 10 is connected to a network 20 such as the Internet and includes a support license management server 30, a use license management server 40, a firewall 50, personal computers (PCs) 60, and a multifunction peripheral 70.

The support license management server 30 manages support licenses. The use license management server 40 manages use licenses. For example the support license management server 30 and the use license management server 40 are provided by a software vendor to manage users' software licenses. The support license management server 30 and the use license management server 40 are implemented by controlling computer hardware including a memory and a processor by using software such as an operating system (OS) and application programs. The support license management server 30 and the use license management server 40 may be implemented by using a single computer hardware resource or by using a plurality of computer hardware resources communicably connected together.

The firewall 50 is provided between the external network 20 and a local network in an organization 200 and limits access via the network 20 to increase security in the organization 200.

The PC 60 is an example of an information processing apparatus and is used by a user in the organization. A plurality of PCs 60 are generally provided in the organization. The information processing apparatus includes a memory and a processor and has a function of performing an information process by using software under user's instructions. Examples of the information processing apparatus also include a smartphone and other portable terminal apparatuses.

The multifunction peripheral 70 has a plurality of functions including those of a printer and a scanner. The printer is an image forming mechanism that forms images on a medium such as paper by using toner, ink, or the like. The multifunction peripheral 70 may be a type of image forming apparatus including the image forming mechanism. The "image formation" on the medium such as paper may be expressed by using a term "printing". Therefore, the term "printing" may be used hereinafter.

The PC 60 and the multifunction peripheral 70 are connected to the firewall 50 and are communicable with external apparatuses via the network 20. The PC 60 and the multifunction peripheral 70 are locally communicable via the firewall 50.

In the organization 200, the user uses the PC 60 to perform an information process. The PC 60 has software such as an application program. The user may instruct the multifunction peripheral 70 to form images of (i.e., print) documents or pictures created, edited, or displayed by using the software. For example, the multifunction peripheral 70 performs printing on paper in response to user authentication performed by reading an IC card of the user. The multifunction peripheral 70 may immediately perform printing without user authentication. In an office or other environments, the user sends print instructions to the multifunction peripheral 70 relatively frequently (e.g., multiple times per day). In every printing, the user walks to the multifunction peripheral 70 and picks up print paper from the multifunction peripheral 70. Also in a case where the multifunction peripheral 70 is used for scanning or copying, the user walks to the multifunction peripheral 70 and operates the multifunction peripheral 70.

In the exemplary embodiment, the software products to be used by the user in the PC 60 include software products whose licenses are managed. In the exemplary embodiment, the software license is categorized into a support license and a use license. The support license is authority to receive a support provided by a software vendor to the user. The use license is authority to use software by the user permitted by the software vendor.

When the user or the user's organization 200 has paid a use license fee to the vendor, a software use license is issued to the user and software is ready to use. In the exemplary embodiment, for example, a one-year use license is issued by paying the use license fee. The effective period of the license is extended by paying a fee for renewal of the use license. Methods for use licenses are not particularly limited. Examples of the method include node-locked licensing, in which software users are identified, and floating licensing, in which software users are not identified but the number of users who simultaneously use software is limited.

In the exemplary embodiment, a user having a use license is given a support license to receive a support for use of software. The term "support" means an action to help a user to install software, make initial settings, and operate the software, or an action to help the user to address troubles. For example, the support is provided by a support staff member telling solutions to the user by means of email, chat, voice call, or video call. The support staff member may remotely operate the user's software. In a case of simple supports, artificial intelligence (AI) may be used in place of the support staff member.

In the exemplary embodiment, software is upgraded at a certain timing (e.g., every few months or every few years). Examples of the upgrade include addition, deletion, and change of functions. Examples of the upgrade also include a start of support for new computer hardware or OS, and a termination of support for old computer hardware or OS. Examples of the upgrade also include a support for other software, a support for a changing cloud environment, and a support for security. A sufficient support is not provided to a user of old-version software even if a use license is given. In the exemplary embodiment, the software support license is effective, for example, only for a predetermined period after purchase (e.g., five years), and is invalid after the period has elapsed. If the software is upgraded to a new version, a new support license is issued in association with the new version. The support license is basically given to a user having a use license but may become invalid irrespective of the use license. Thus, the support license is distinguished from the use license.

The support license is managed by the support license management server 30. The use license is managed by the use license management server 40. If the support license management server 30 and the use license management server 40 directly manage the licenses of the PCs 60, loads on the support license management server 30 and the use license management server 40 increase. Further, communication settings are complicated to achieve the license management for the PCs 60 by the support license management server 30 and the use license management server 40 via the firewall 50. In the exemplary embodiment, the multifunction peripheral 70 partially manages the support licenses and the use licenses of the PCs 60 as described below to provide attentive services for users around the multifunction peripheral 70.

Figure 2:
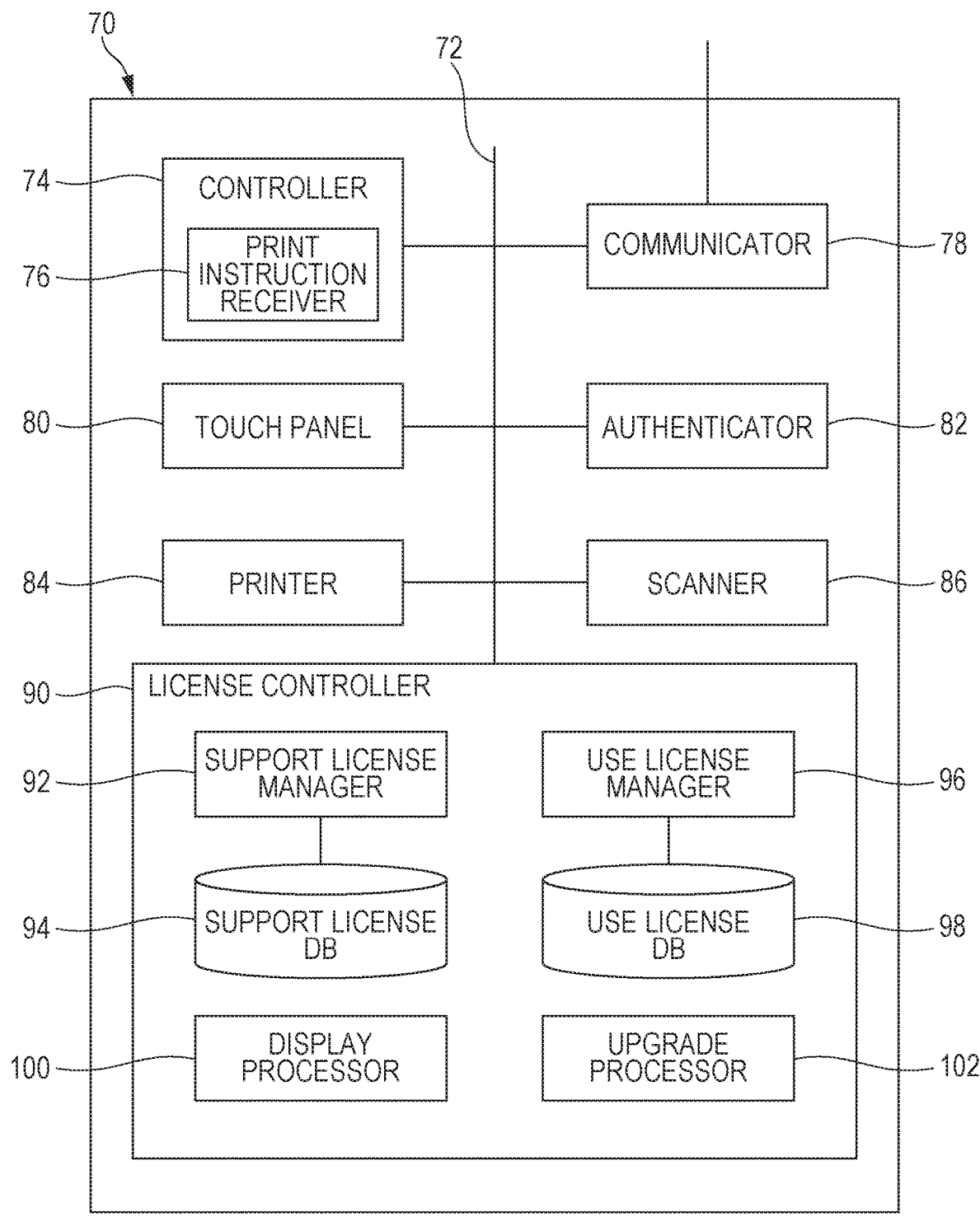
FIG. 2 is a schematic diagram illustrating the configuration of a multifunction peripheral.

FIG. 2 illustrates the functional configuration of the multifunction peripheral 70. The multifunction peripheral 70 includes a bus 72 as a communication path. The multifunction peripheral 70 further includes a controller 74, a print instruction receiver 76, a communicator 78, a touch panel 80, an authenticator 82, a printer 84, a scanner 86, and a license controller 90, which are connected to the bus 72.

The controller 74 controls the components of the multifunction peripheral 70. The controller 74 includes a memory and a processor and operates by controlling the memory and the processor by using software. The controller 74 includes the print instruction receiver 76. The print instruction receiver 76 is an example of a receiver and receives print instructions input by the users of the PCs 60 via the communicator 78. When the print instruction receiver 76 receives a print instruction, the controller 74 instructs the printer 84 to perform printing and instructs the license controller 90 to control licenses as described later. The controller 74 causes the printer 84 or the scanner 86 to operate in response to reception of a copying instruction, a scanning instruction, or various other instructions via the touch panel 80.

The communicator 78 communicates with external apparatuses by controlling a communication circuit by using software. The communicator 78 is connected to the firewall 50 through a communication cable.

The touch panel 80 is a user interface including a display that displays images, and a detector that detects users' operations on the display. The touch panel 80 is provided near the top of the multifunction peripheral 70 at a position where the users may easily find the touch panel 80. The touch panel 80 displays various operation buttons to be used by the users for operating the multifunction peripheral 70. The touch panel 80 also displays messages for the users. Details of the messages are described later. The touch panel 80 is a type of "panel". The panel includes at least a display. For example, a user interface similar to the touch panel 80 may be implemented by combining a display and mechanical buttons.

The authenticator 82 authenticates the users. Examples of the authenticator 82 include a non-contact IC card reader. The authenticator 82 authenticates a user by reading an IC card of the user and comparing the read information with preregistered user information. Examples of the authenticator 82 also include a password receiver. In this case, the authenticator 82 verifies a password input by a user. The authenticator 82 is enabled to improve security of the multifunction peripheral 70. When the authenticator 82 is enabled, printing is performed based on a user's print instruction, for example, after the authenticator 82 has authenticated the user. Thus, a third person is prevented from obtaining print paper of the user. If a high security level is not needed, the authenticator 82 may be disabled.

The printer 84 is an image forming mechanism that forms images on a medium such as paper. When the print instruction receiver 76 receives a print instruction or when a copying instruction is made via the touch panel 80, the printer 84 performs printing and paper with an image is delivered to a predetermined position.

The scanner 86 reads texts or pictures on paper set at a predetermined position to obtain electronic data.

The license controller 90 is an example of a license manager and performs various types of control necessary to manage the software licenses of the PCs 60. The license controller 90 is implemented by controlling a memory and a processor by using software. The memory and the processor may be identical to or different from the memory and the processor of the controller 74. The license controller 90 includes a support license manager 92, a support license database (DB) 94 associated with the support license manager 92, a use license manager 96, a use license DB 98 associated with the use license manager 96, a display processor 100, and an upgrade processor 102.

The support license manager 92 manages the support licenses by using the support license DB 94. The support license DB 94 stores management information on the support licenses. In the support license DB 94, software information is registered in association with software whose support license is managed. Further, information about a version of the software associated with the support license issued to a user is registered.

The support license manager 92 shares necessary information through communication with the support license management server 30 periodically or upon every event. The support license manager 92 functions as a notifier that notifies the support license management server 30 that the user is not upgrading software. The support license manager 92 manages, in place of the support license management server 30, the support licenses of the information processing apparatuses such as the PCs 60 in the organization 200 (i.e., information processing apparatuses behind the firewall 50 from the viewpoint of the communication environment). Therefore, a support staff member or the like provides a support while checking the support license based on the information managed by the support license manager 92.

The use license manager 96 manages the use licenses by using the use license DB 98. The use license DB 98 stores management information on the use licenses. In the use license DB 98, information about a status of a license is registered in association with software and with a unit of license contract (may be each user or the organization 200). Examples of the registered information include a license period and a status of payment of a license fee.

The use license manager 96 shares necessary information through communication with the use license management server 40 periodically or upon every event. The use license manager 96 manages, in place of the use license management server 40, the use licenses of the information processing apparatuses such as the PCs in the organization 200. For example, if any user is going to use software, the use license manager 96 checks whether the user has a use license in response to an inquiry from the software, and replies that the software may be used or not. The use license manager 96 functions as a notifier that transmits the information on the use licenses to the use license management server 40.

The display processor 100 is an example of a display controller and controls the touch panel 80 to display a software license management message and an operation button. Examples of the message include a support license management message. Examples of the support license management message include a message about an expiry date of a support license. Examples of the message about an expiry date of a support license include a message that the expiry date is coming, a message that the expiry date has passed, and a message that the expiry date has passed but the support license is in a grace period. Examples of the support license management message also include a message that prompts the user to upgrade the software to a version the support license applies to. Examples of the message that prompts the user to upgrade the software to a version the support license applies to include a message that the support license will not cover a current version, and a message that the support license should be renewed. The display processor 100 may prepare at least two types of support license management message and switch the messages stepwise. Thus, a stronger alert message may be displayed, for example, immediately before the support license is invalidated. The display processor 100 may control the touch panel 80 to display not only the message but also a start button to start a procedure of the upgrading of the software to a version the support license covers support for. In response to an operation on the start button, the upgrade processor 102 takes over the process. The display processor 100 may control the touch panel 80 to display not only the start button but also a button to reject the upgrade procedure.

The display processor 100 may control the touch panel 80 to display a use license management message. Examples of the use license management message include a message about an expiry date of a use license. Examples of the message about an expiry date of a use license include a message that the expiry date is coming, a message that the expiry date has passed, and a message that the expiry date has passed but the use license is in a grace period. Examples of the use license management message also include a message that prompts the user to renew the use license. Examples of the message that prompts the user to renew the use license include a message that a use license fee is not paid for a next period, and a message about a method for renewing the license, such as a method for paying the use license fee for the next period. The display processor 100 may prepare at least two types of use license management message and switch the messages stepwise. Thus, a stronger alert message may be displayed, for example, immediately before the use license is invalidated. The display processor 100 may control the touch panel 80 to display not only the message but also a start button to start a procedure of the renewal of the use license. In response to an operation on the start button, the upgrade processor 102 takes over the process. The display processor 100 may control the touch panel 80 to display not only the start button but also a button to reject the renewal procedure.

In response to an operation on the start button displayed on the touch panel 80, the upgrade processor 102 performs a process for a procedure of the renewal of a support license or a use license. In the exemplary embodiment, the support license is renewed by upgrading software. For example, the process for the procedure of the renewal of the support license involves displaying an indication on a user's PC 60 so that the software is promptly downloaded or upgraded. Specifically, an icon, button, or window representing a hyperlink to a uniform resource locator (URL) of a software download provider is displayed. An electronic mail containing the hyperlink to the URL of the software download provider may be sent to the user. Further, a software upgrade execution file may be transmitted to and displayed on the PC 60.

For example, the process for the procedure of the renewal of the use license involves, if the user is a contractor, displaying a renewal procedure window on the user's PC to pay the license fee. Further, the process involves, if the user is not a contractor, making contact with a person in charge of contract by sending email about the necessity for the renewal procedure.

(2) Operations of Information Processing System

Next, operations of the information processing system 10 are described.

Figure 3:
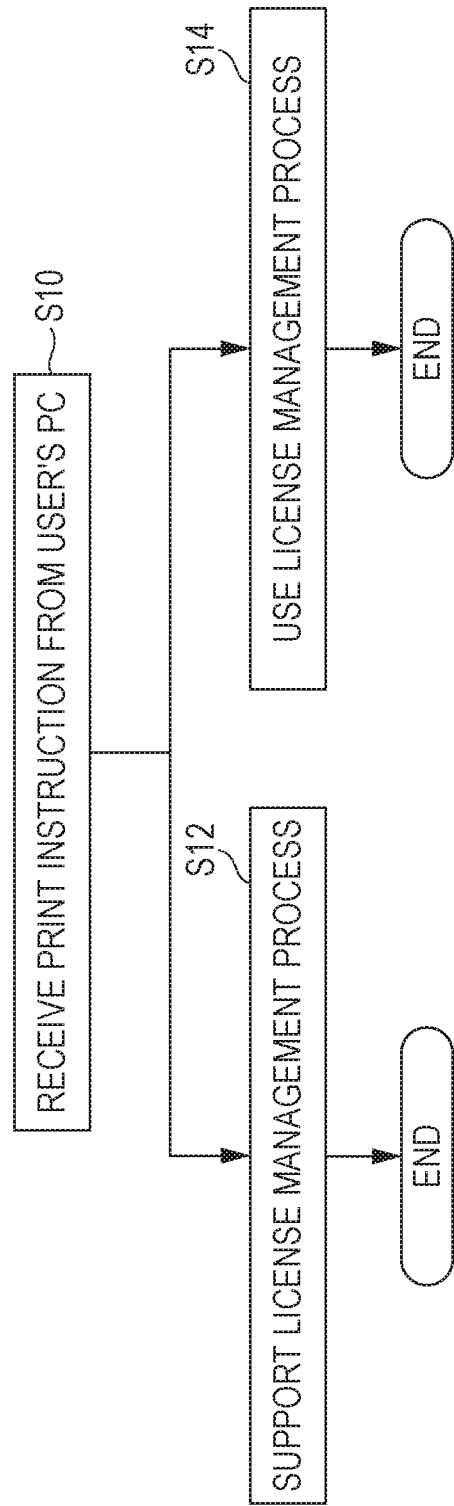
FIG. 3 is a flowchart illustrating a flow of an overall process to be performed by the multifunction peripheral.

FIG. 3 is a flowchart illustrating an overall process related to licenses. In this process, a user uses software on his/her PC 60 and operates the software to send a print instruction to the multifunction peripheral 70. In this case, the print instruction receiver 76 of the multifunction peripheral 70 receives the print instruction (S10).

When the print instruction receiver 76 receives the print instruction, the controller 74 causes the authenticator 82 to perform an authentication process as necessary and causes the printer 84 to perform a printing process. Concurrently, the license controller 90 performs a support license management process (S12) and a use license management process (S14) in the following manners for the software that has sent the print instruction. The software that has sent the print instruction may generally be identified by analyzing data about the print instruction.

(2-1) Support License Management Process

The support license management process is described with reference to FIG. 4 to FIG. 11.

Figure 4:
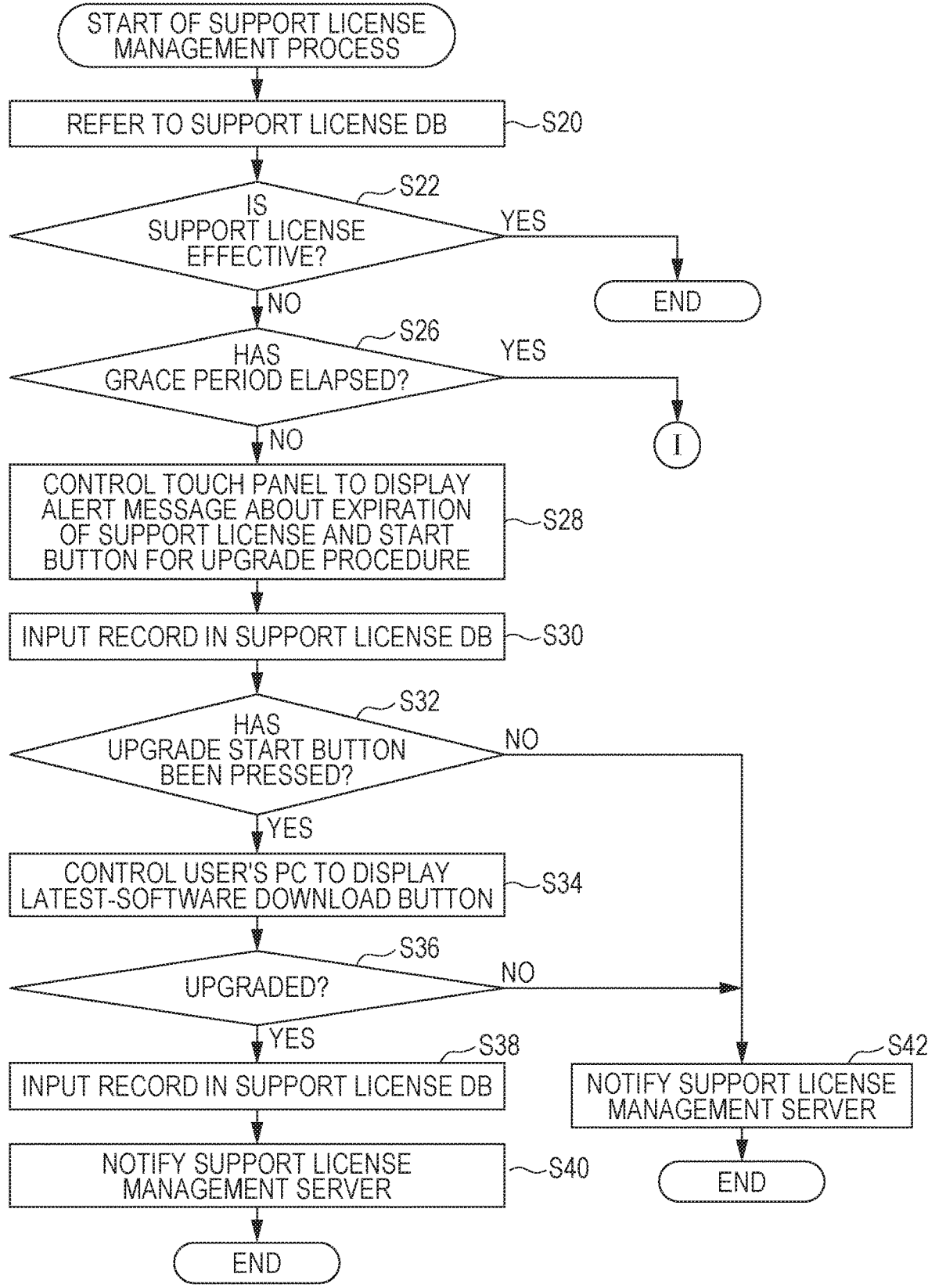
FIG. 4 is a flowchart illustrating a flow of a support license management process.
Figure 5:
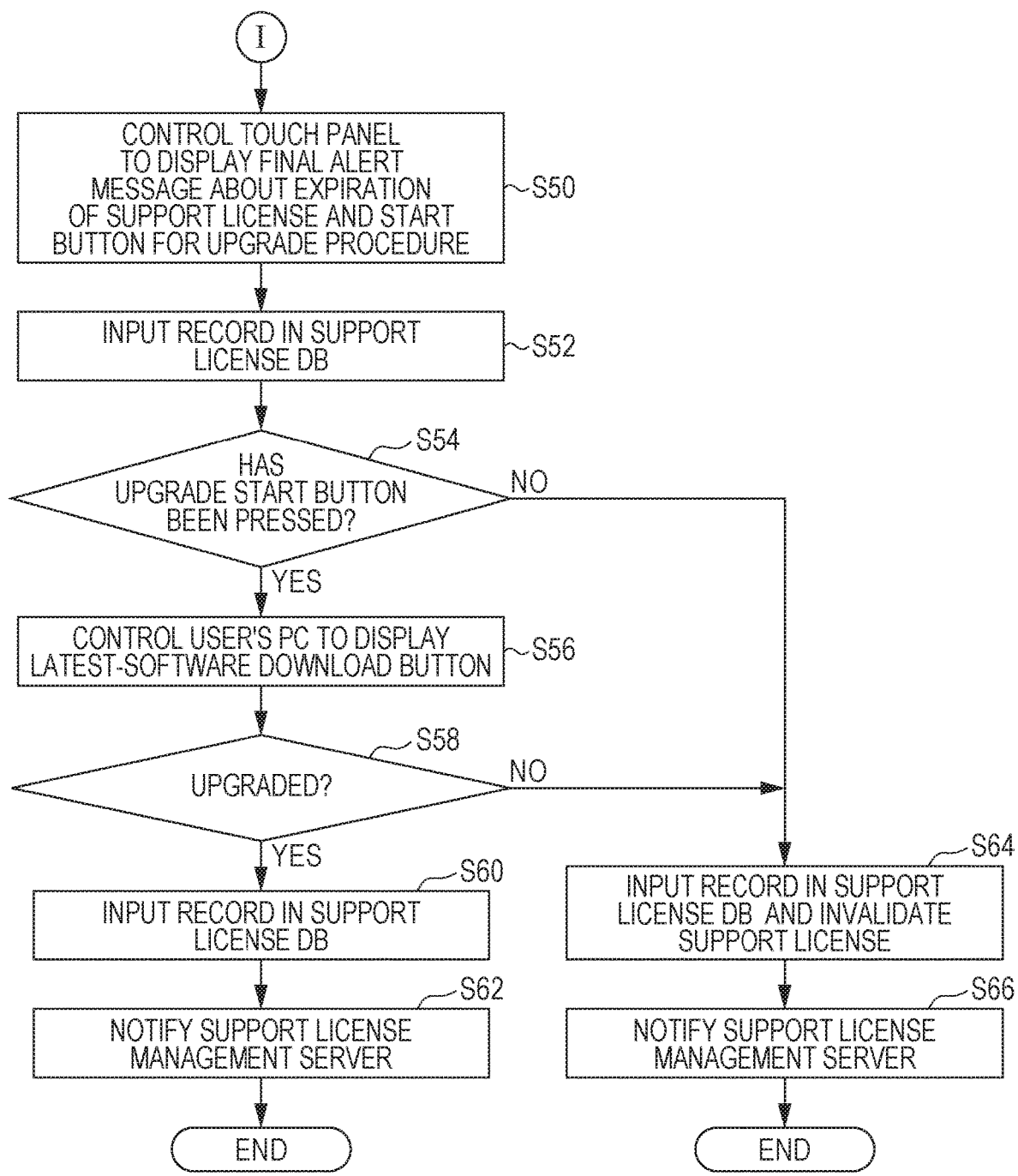
FIG. 5 is a flowchart illustrating continuation of the flow of the support license management process.

FIG. 4 and FIG. 5 are flowcharts illustrating a flow of the support license management process. The flow in FIG. 5 continues from a connector "I" in FIG. 4. As illustrated in FIG. 4, in response to the start of the support license management process, the support license manager 92 first refers to the support license DB 94 (S20). The support license manager 92 checks whether the user who has sent the print instruction has an effective support license (S22).

An example of data managed in the support license DB 94 is described with reference to FIG. 6 and FIG. 7. FIG. 6 illustrates a list of all software products managed in the support license DB 94. In the list, a "software product" field shows product names of the managed software products. A "supported" field shows names of currently effective support licenses. An "unsupported" field shows names of expired support licenses. An "expiry date of support" field shows expiry dates of the support licenses. In the exemplary embodiment, the support license name is identical to a software version name. Therefore, a user of software with a certain version is given a support license having the same name as the version.

Regarding a software product "XX", the support expiry date of a support license "9.0" is Oct. 1, 2024, the support expiry date of a support license "8.0" is Jun. 1, 2022, and the support expiry date of a support license "7.0" is Aug. 1, 2020. In the exemplary embodiment, a current time range is assumed to be Dec. 5, 2019 to January 2020. The above versions are versions the support license covers support for because the support expiry dates have not passed. The support expiry date of a support license "6.0" is Dec. 1, 2019 and the support expiry date of a support license "5.0" is Sep. 1, 2018. Those versions are versions the support license does not cover support for because the support expiry dates have passed. Regarding a software product "YY", the support licenses are effective for all software versions.

Figure 7:
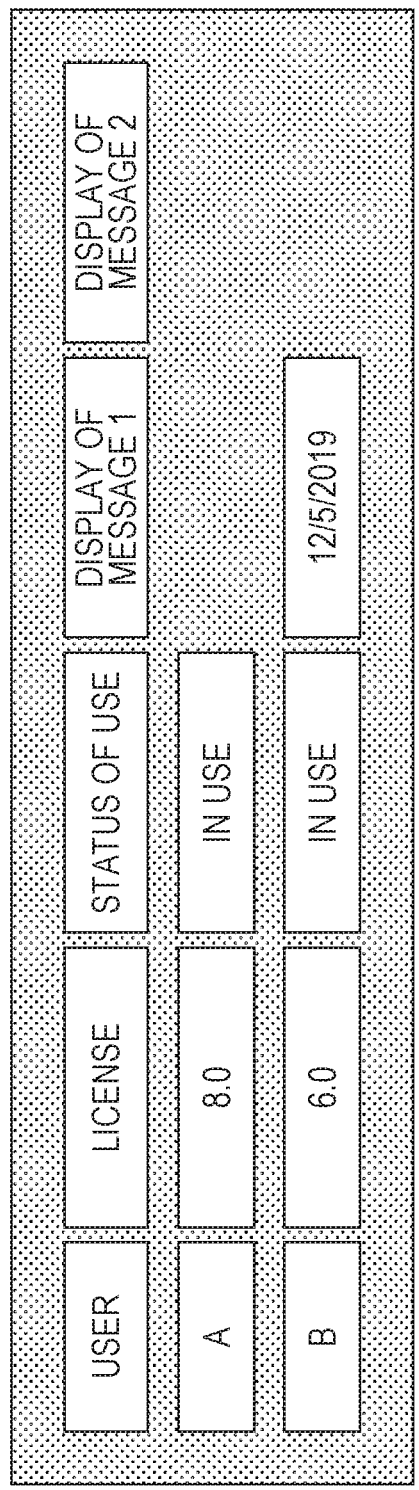
FIG. 7 illustrates an example of data about a certain software product recorded in the support license DB.

FIG. 7 illustrates a list of management information about the software product "XX" associated with users. A "user" field shows user names. A "license" field shows names of effective support licenses. As described above, the support license name is also a version name of software in use. A "status of use" field has a record "in use" if a predetermined period (e.g., three months) has not elapsed since the software was used last time, and a record "not in use" if the predetermined period has elapsed. A "display of message 1" field shows dates when a first message about expiration of a support license was displayed on the touch panel 80. A "display of message 2" field shows dates when a second message about expiration of a support license was displayed on the touch panel 80. In the exemplary embodiment, the second message is a final alert message.

In the example illustrated in FIG. 7, a user A is given the support license "8.0" and the software is "in use", which means that the software is used continuously. According to the management list illustrated in FIG. 6, the support license "8.0" is effective until Jun. 1, 2022 and the support is available. Therefore, neither the first message nor the second message has been displayed. A user B is given the support license "6.0" and the software is in use. According to the management list illustrated in FIG. 6, the support expiry date of the support license "6.0" has passed on Dec. 1, 2019 and this version is, in a strict sense, a version the support license does not cover support for. Therefore, the first message was displayed on Dec. 5, 2019.

The description continues with reference to FIG. 4 again. The series of processes in the flowchart is performed for the user A in FIG. 7. In this case, the support license manager 92 determines, in Step S22, that the user A has an effective support license. Thus, the support license management process is terminated. The series of processes in the flowchart is performed for the user B in FIG. 7. In this case, the support license manager 92 determines, in Step S22, that the user B has no effective support license (i.e., the support has expired). Thus, the process proceeds to Step S26.

In Step S26, the support license manager 92 determines whether a grace period has elapsed after the expiration of the support. The grace period may be set variously. For example, the grace period may be a predetermined number of days after the expiration of the support. If the predetermined number of days is, for example, 30 days, the grace period of the user B ends on Dec. 31, 2019. The grace period may also be a predetermined number of days (e.g., 30 days) after a message about the expiration of the support was sent to the user B. If the predetermined number of days is 30 days, the grace period of the user B ends on Jan. 4, 2020. If the grace period has elapsed, the process is described later with reference to the flowchart of FIG. 5. If the grace period has not elapsed, the process proceeds to Step S28. In Step S28, the display processor 100 controls the touch panel 80 to display an alert message about the expiration of the support license and a start button to start an upgrade procedure.

Figures 8, 9:
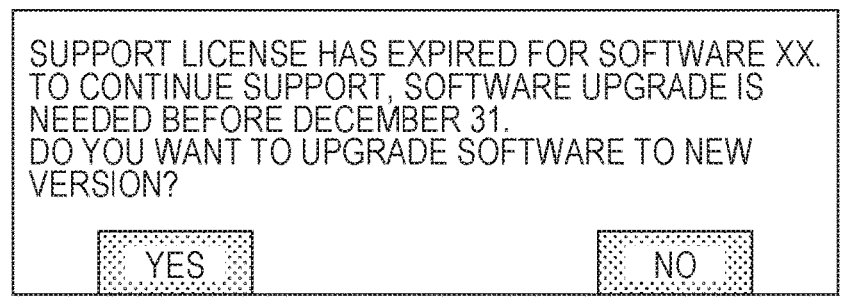
FIG. 8 illustrates an example of an alert message displayed on a touch panel.
FIG. 9 illustrates an example of information displayed on a support license management server.

FIG. 8 illustrates an example of the message displayed on the touch panel 80. In this case, a message "Support license has expired for software XX. To continue support, software upgrade is needed before December 31. Do you want to upgrade software to new version?" is displayed. This message is displayed to notify the user of the expiration of the support and the grace period for the identified software and to prompt the user to upgrade the software. A "Yes" button and a "No" button are displayed below the message. The "Yes" button is a start button to start a process shown in the message. The "No" button is a button to reject the process.

After the display processor 100 has controlled the touch panel 80 to display the message illustrated in FIG. 8, the support license manager 92 inputs a record of message display in the support license DB 94 (S30). The display of the message illustrated in FIG. 8 corresponds to "display of message 1" in the list of FIG. 7. In the example illustrated in FIG. 7, a date "Dec. 5, 2019" is input to the "display of message 1" field.

Next, the support license manager 92 determines whether the upgrade start button is pressed (S32). If the upgrade start button is pressed, the upgrade processor 102 performs a process of, for example, controlling the PC 60 of the user B to display a latest-software download button (S34). The process of displaying the download button is an example of a process of displaying guidance information that prompts the user to complete a procedure of the upgrading of software. For example, the user B may complete the software upgrade by operating the download button and pressing an installation button as appropriate after the download.

After the upgrade processor 102 has controlled the PC 60 to display the download button, the support license manager 92 checks whether the user B has actually upgraded the software (S36). During the software upgrade, the PC 60 transmits information for license management to the multifunction peripheral 70. Based on this information, the support license manager 92 may check whether the software has been upgraded.

If the software has been upgraded, the support license manager 92 records a new support license name in the support license DB 94 (S38). That is, the value of the support license of the user B is renewed in the list illustrated in FIG. 7. The support license manager 92 notifies the support license management server 30 that the support license of the user B has been renewed (S40). Thus, the information on the support license of the user B is updated in the support license management server 30.

If the "No" button is pressed in Step S32 to reject the upgrade or if the software is not upgraded in Step S36, the support license manager 92 inputs a record in the support license DB 94 as necessary and notifies the support license management server 30 (S42). The support license management server 30 is notified that the software has not been upgraded despite "display of message 1".

FIG. 9 illustrates an example in which information managed by the support license management server 30 is displayed on a display screen of the support license management server 30. The display screen includes a "software product" field showing product names of software products, a "user" field showing user names, a "license" field showing names of support licenses, and a "status of license" field showing statuses of the support licenses. Regarding the software "XX", the license of the user B is "6.0" and has expired. In response to a support request from the user B, a support staff member may provide a support while correctly grasping the status of the license of the user B.

In the flowchart of FIG. 4, the same alert message is displayed in response to every print instruction until the grace period elapses (S28). The frequency of the message display may be adjusted in the following manner. For example, the alert message is displayed once after several print instructions in a stage in which sufficient days remain in the grace period, and the alert message is displayed more frequently as the end of the grace period is approaching.

FIG. 5 illustrates a flow of a process in a case where the grace period has elapsed in Step S26 of FIG. 4. If the grace period has elapsed, the display processor 100 controls the touch panel 80 to display a final alert message about the expiration of the support license and the start button for the upgrade procedure (S50).

Figures 10, 11:
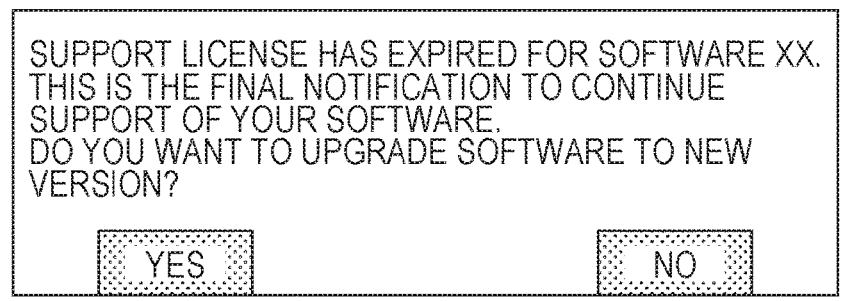
FIG. 10 illustrates an example of a final alert message displayed on the touch panel.
FIG. 11 illustrates an example of information displayed on the support license management server.

FIG. 10 illustrates an example of the displayed final alert message. In this case, a message "Support license has expired for software XX. This is the final notification to continue support of your software. Do you want to upgrade software to new version?" is displayed. This message is displayed to notify the user of the expiration of the support for the identified software and to prompt the user to upgrade the software by issuing a final alert that the software is unsupported without upgrade. The touch panel 80 also displays the "Yes" button to start the upgrade, and the "No" button to reject the upgrade.

In response to the display of the final alert message, the support license manager 92 inputs a record of the display of the final alert message in the support license DB 94 (S52). In the example of the support license DB 94 illustrated in FIG. 7, a date is input to the "display of message 2" field corresponding to the final alert message. The support license manager 92 determines whether the upgrade start button is pressed (S54).

If the start button is pressed, the upgrade processor 102 controls the PC 60 of the user B to display the software download button (S56). Then, the support license manager 92 determines whether the upgrade process has been completed within a predetermined time (e.g., one hour) (S58). If the software has been upgraded, the support license manager 92 records information on the upgrade in the support license DB 94 (S60) and notifies the support license management server 30 (S62). Thus, a support staff member may grasp that the support license of the user B has been renewed.

If the "No" button is pressed but the upgrade button is not pressed in Step S54 or if the upgrade is not completed within the predetermined time in the determination of Step S58, the support license manager 92 inputs a record of invalidation of the support license in the support license DB 94 and invalidates the support license (S64). In the example of the list illustrated in FIG. 7, the "status of use" field for the license of the user B is changed to "invalid". The support license manager 92 notifies the support license management server 30 that the support license of the user B has been invalidated (S66).

FIG. 11 illustrates that the display screen of the support license management server 30 in FIG. 9 is updated. A "final alert" field is added to the list illustrated in FIG. 9 to show that the final alert has been "issued". A support staff member who views the screen grasps that the support license of the user B has been invalidated through the final alert.

In the example described above, when the support license for the software is invalidated, the software may still be used though the support is not provided. When the support license is invalidated, the use of the software may be limited partially or forbidden completely. When the support license is invalidated, a support may be provided partially. For example, a support may be provided for functions still available in a current software version instead of being stopped completely. Thus, the effect of the support license may be set variously.

In the example described above, the alert message is displayed while setting the grace period after the support expiry date of the software support license, and the final alert message is displayed after the grace period has elapsed. However, the grace period may be omitted and the final alert message may be displayed immediately when the support expiry date has passed. The support license may be invalidated if the software is not promptly upgraded after the final alert message has been displayed. In this case, an alert message that the support expiry date is coming may be displayed before the support expiry date passes.

In the above description, the final alert message is displayed when the grace period has elapsed. However, the grace period may be omitted and the final alert message may be displayed when the alert message is displayed a predetermined number of times (e.g., five times). In this case, the alert message may be displayed together with information indicating the remaining count of print instructions before which the user needs to upgrade the software.

(2-2) Use License Management Process

The use license management process is described with reference to FIG. 12 to FIG. 18.

Figure 12:
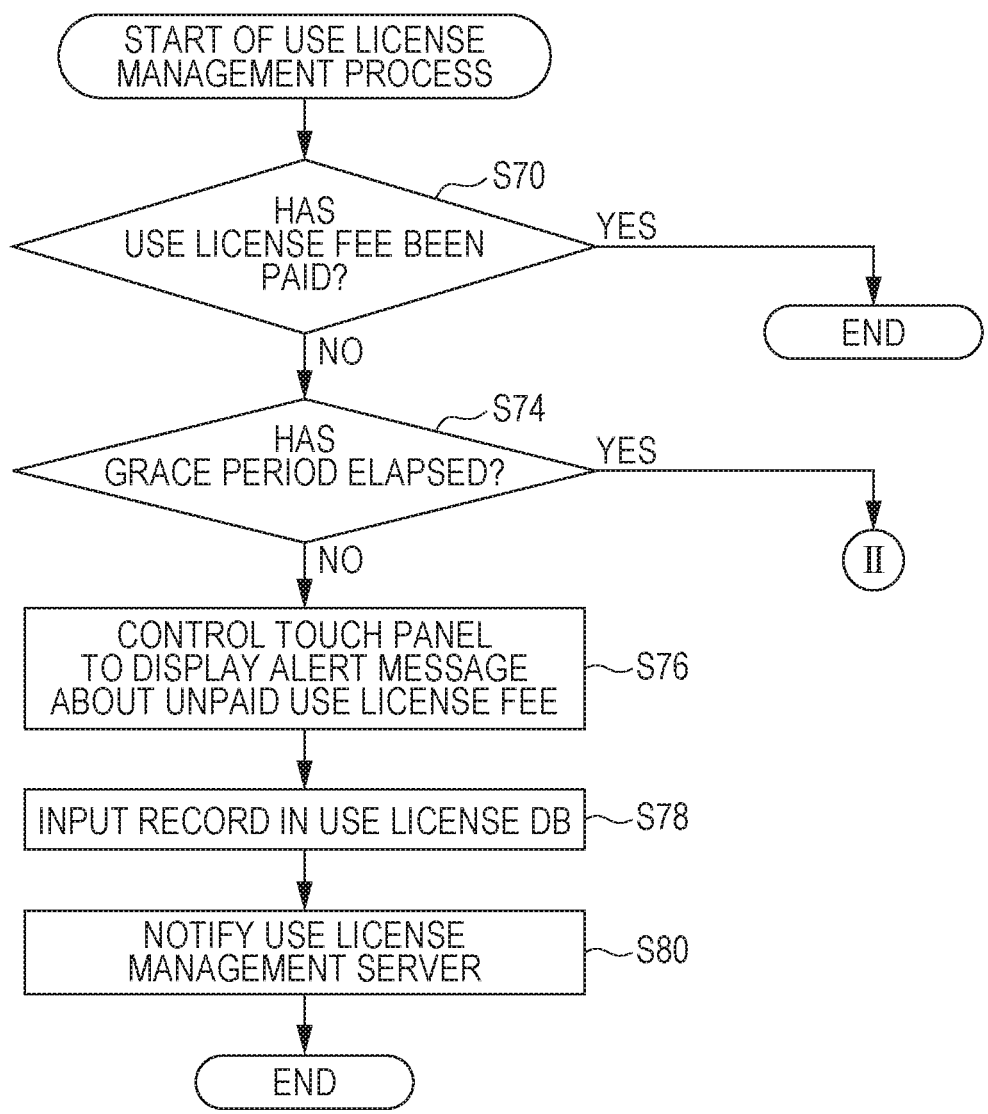
FIG. 12 is a flowchart illustrating a flow of a use license management process.
Figure 13:
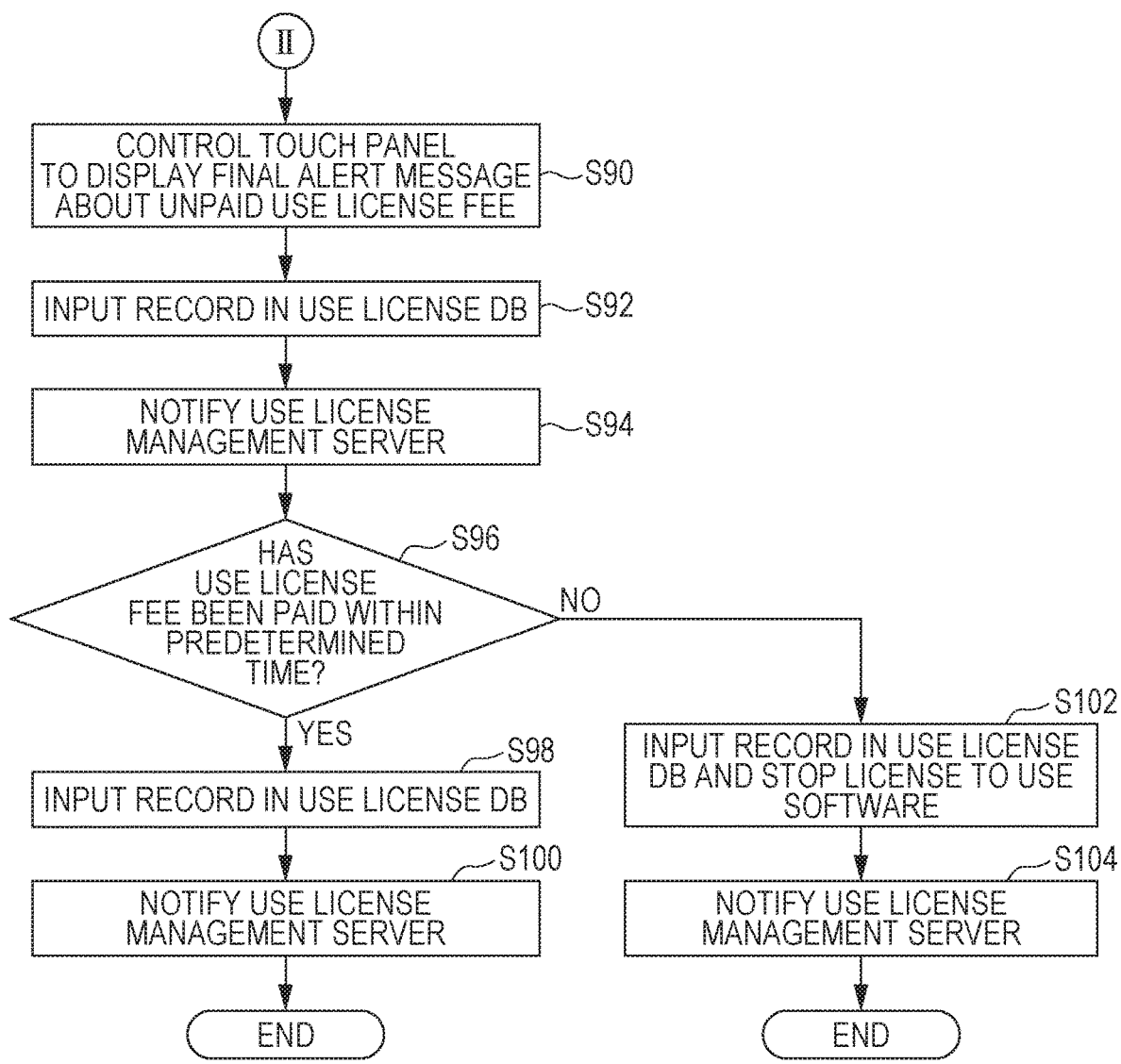
FIG. 13 is a flowchart illustrating continuation of the flow of the use license management process.

FIG. 12 and FIG. 13 are flowcharts illustrating a flow of the use license management process. The flow in FIG. 13 continues from a connector "II" in FIG. 12. As illustrated in FIG. 12, in response to the start of the use license management process, the use license manager 96 refers to the use license DB 98 and checks whether a use license fee has been paid (S70).

FIG. 14 illustrates a list of statuses of use licenses for the software "XX" recorded in the use license DB 98. The list includes a "company name" field, a "license" field, a "status of use" field, an "expiry date" field, a "status of billing" field, a "display of message 1" field, and a "display of message 2" field. The "company name" field shows names of companies having use licenses. The use license may be issued directly to a user but, in the exemplary embodiment, a company pays a fee and the use license is issued to the company. However, users belonging to the company actually use the software based on the use license. In the exemplary embodiment, the multifunction peripheral 70 is shared among a plurality of companies in an office including many ventures. Therefore, a company C and a company D are registered in the "company name" field. The support license differs from the use license in that the support licenses are individually issued to the user A and the user B who are employees of the company C or the company D.

Names of the issued use licenses are recorded in the "license" field. The name of the use license is assigned so that the name is identical to the name of the latest version among a plurality of versions of software having the use license. The company C has purchased a use license "9.0" that permits use of the latest software version 9.0. The company D has purchased a use license "8.0" that permits use of an older software version 8.0. The "status of use" field shows whether the licenses are in their effective periods. For both the company C and the company D, a value "in use" is given to indicate that the licenses are in the effective periods. The "expiry date" field shows expiry dates of the currently paid use licenses. The expiry date of the use license of the company C is Dec. 10, 2019. The expiry date of the use license of the company D is Aug. 15, 2020.

Statuses of payment of the license fee are recorded in the "status of billing" field. For example, if a current time range is after Dec. 13, 2019, the expiry date of the use license of the company C has passed. Therefore, an entry "unpaid from December 11" is recorded. For the company D, a value "paid" is recorded to indicate that the fee has been paid.

The "display of message 1" field shows dates when a first message about an unpaid license fee was displayed. A record for the company C indicates that the first message was displayed on Dec. 13, 2019. The "display of message 2" field shows dates when a second message was displayed as a final alert message.

If the determination in Step S70 of FIG. 12 is made for users belonging to the company D, the use license management process is immediately terminated because the use license fee has been paid. If the determination in Step S70 of FIG. 12 is made for users belonging to the company C, the determination is made that the use license fee has not been paid. Then, determination is made in Step S74.

In Step S74, determination is made whether a grace period has elapsed after the expiry date of the use license. The grace period is set to address, for example, expiration of a period of payment of the license renewal fee. For example, the grace period is set to 30 days. If the grace period has elapsed in Step S74, the process is described later with reference to FIG. 13. If the grace period has not elapsed, the display processor 100 controls the touch panel 80 to display an alert message about the unpaid use license fee (S76).

Figures 15, 16:
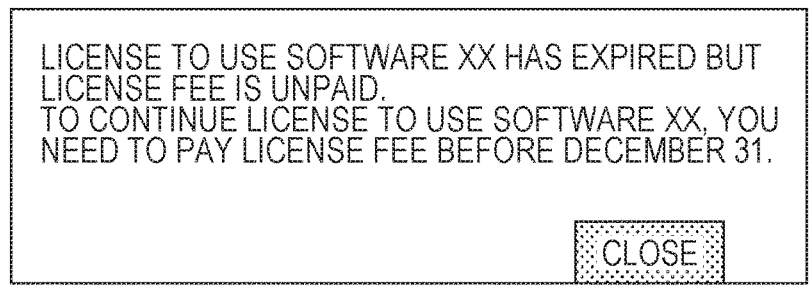
FIG. 15 illustrates an example of an alert message displayed on the touch panel.
FIG. 16 illustrates an example of information displayed on a use license management server.

FIG. 15 illustrates an example of the alert message displayed on the touch panel 80. In this case, a message "License to use software XX has expired but license fee is unpaid. To continue license to use software XX, you need to pay license fee before December 31." is displayed. This message means that the expiry date of the use license for the identified software has passed, the license renewal fee has not been paid, and the software will become unavailable unless the fee is paid by the end of the grace period that is December 31. In the example illustrated in FIG. 15, a "close" button is displayed to close the message. Unlike the support license, a start button to start a procedure of the payment of the renewal fee is not displayed. This is because the renewal fee is paid by a company instead of a user. If the renewal fee is paid by a user, the start button to start the procedure of the payment of the renewal fee may be displayed. If the renewal fee is paid by a company, a button to send an email or the like to a person in charge of payment may be displayed.

The description continues with reference to the flowchart of FIG. 12 again. In response to the display of the alert message, the use license manager 96 inputs a record of the display of the alert message in the use license DB 98 (S78). In the example of the list illustrated in FIG. 14, a date "Dec.

13, 2019" when the alert message was displayed is input to the "display of message 1" field. The use license manager 96 notifies the use license management server 40 that the alert message was displayed (S80).

FIG. 16 illustrates an example of information recorded in the use license management server 40 and displayed on a display of the use license management server 40. The displayed information includes a "software product" field, a "company name" field, a "license" field, and a "status of billing" field. As the software product, a product name "XX" of the target software is displayed. As the company name, the name "company C" is displayed. As the license name, "9.0" is displayed. As the status of billing, an entry "unpaid from December 11" is displayed. Thus, a support staff member may grasp that the renewal fee is unpaid though the use license of the company C has expired. In the example illustrated in FIG. 16, a field for the display of the first message may be set.

In the flowchart of FIG. 12, the same alert message is displayed in response to every print instruction until the grace period elapses (S76). The frequency of the message display may be adjusted in the following manner. For example, the alert message is displayed once after several print instructions in a stage in which sufficient days remain in the grace period, and the alert message is displayed more frequently as the end of the grace period is approaching.

Next, a process after the elapse of the grace period for payment of the renewal fee of the use license is described with reference to FIG. 13. If the grace period has elapsed, the display processor 100 controls the touch panel 80 to display a final alert message (S90).

Figures 17, 18:
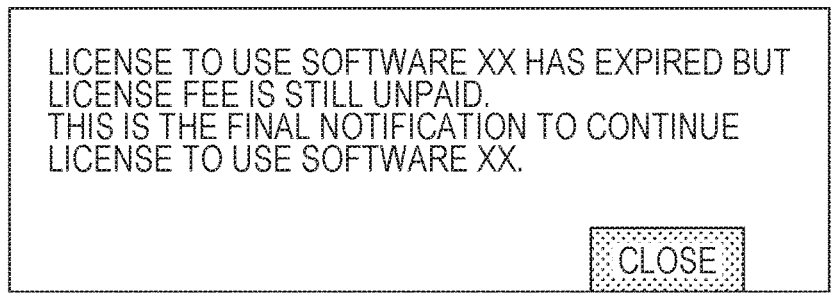
FIG. 17 illustrates an example of a final alert message displayed on the touch panel.
FIG. 18 illustrates an example of information displayed on the use license management server.

FIG. 17 illustrates an example of the final alert message. In this example, a message "License to use software XX has expired but license fee is still unpaid. This is the final notification to continue license to use software XX." is displayed. This message means that the renewal fee is unpaid though the expiry date of the license related to the identified software has passed. This message also means an alert that the software will become unavailable unless the fee is paid immediately. In the example of FIG. 17, a button to close the message window is displayed as well. In the example of FIG. 17, other buttons may be displayed as described with reference to FIG. 15.

The use license manager 96 inputs a record of the display of the final alert message in the use license DB 98 (S92). In the example of the list illustrated in FIG. 14, a date of the display is recorded in the "display of message 2" field corresponding to the final alert message. The use license manager 96 notifies the use license management server 40 (S94).

FIG. 18 illustrates an example of information recorded in the use license management server 40 and displayed on the display of the use license management server 40. In FIG. 18, a "final alert" field is added to the information illustrated in FIG. 16 to show that the final alert message has been displayed. Thus, a support staff member may grasp that the renewal fee is unpaid though the use license of the company C has expired, and that the final alert has been issued.

Next, the use license manager 96 checks whether the license fee has been paid within a predetermined time (S96). The predetermined time is set to a period in which the payment may be confirmed (e.g., a period in which the fact of payment may be confirmed when the fee has immediately been paid by direct deposit or by a credit card). If the fee has been paid, the fact of payment is transmitted to the multi-function peripheral 70. Thus, the use license manager 96 may confirm the payment.

If the fee has been paid, the use license manager 96 records a new expiry date or the like in the use license DB 98 (S98). The use license manager 96 notifies the use license management server 40 that the use license has been renewed (S100). Thus, a support staff member may provide a support for the user while checking information on the latest use license.

If the fee has not been paid, the use license manager 96 inputs a record in the use license DB 98 and stops the use license for the software (S102). The use license manager 96 notifies the use license management server 40 that the use license for the software has been invalidated (S104). In response to an inquiry from the user, a support staff member may send a reply while grasping that the use license has been invalidated.

In the above description, the first alert message about the use license is displayed on the touch panel 80 after the expiry date of the use license (i.e., the expiry date ignoring the grace period) has passed. Then, the final alert message is displayed when the grace period has elapsed. However, the timings to display the messages may be changed variously. For example, the first alert message may be displayed when the expiry date is coming, and the final alert message may be displayed immediately when the expiry date has passed.

In the above description, the final alert message is displayed when the grace period has elapsed. However, the grace period may be omitted and the final alert message may be displayed when the alert message is displayed a predetermined number of times (e.g., five times). In this case, the alert message may be displayed together with information indicating the remaining count of print instructions before which the user needs to upgrade the software.

In this exemplary embodiment, when a user sends a print instruction by using software, messages about a support license and a use license for the software are displayed on the touch panel 80. However, some software products are not used by the user for print instructions. Therefore, if a certain user sends print instructions via a certain software product at a low frequency, messages about the certain software product may be displayed on the touch panel 80 in response to the user sending a print instruction via a different software product.

In this exemplary embodiment, messages about software are displayed only on the touch panel 80 of the multifunction peripheral 70. However, similar messages may be displayed on the user's PC 60 in addition to the touch panel 80.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   an image forming mechanism;
   a panel serving as a user interface of the image forming mechanism;
   a controller that receives an image forming instruction for the image forming mechanism from a user of an information processing apparatus;

a display controller that controls the panel to display, in response to the controller receiving the image forming instruction, a message about management of a license related to software installed in the information processing apparatus by referring to management information of the software, wherein the license is either a support license or a use license, and the use license and the support license are seperately managed; and a license controller configured to manage a support license database and a use license database as the support license and the use license are seperately managed, wherein the support license allows a support staff member or an artificial intelligence (AI) to provide assistance to the users to install or operate the software, the use license allows users operating the software but does not involve providing assistance by the support staff or an AI to install or operate the software, and the support license and the use license have separate expiration dates.

2. The image forming apparatus according to claim 1, wherein the license related to the software is a support license for the software.

3. The image forming apparatus according to claim 2, wherein the message is a message about an expiry date of the support license, or a message that prompts the user to upgrade the software to a version the support license applies to.

4. The image forming apparatus according to claim 3, wherein the display controller controls the panel to display a start button to start a procedure of the upgrading of the software to the version the support license applies to.

5. The image forming apparatus according to claim 4, wherein the display controller controls the panel to display, in response to receiving an operation on the start button, guidance information that prompts the user to complete the procedure.

6. The image forming apparatus according to claim 4, further comprising a notifier that notifies a server that manages the support license of the software, in response to absence of an operation on the start button, that the user is not upgrading the software.

7. The image forming apparatus according to claim 3, wherein the display controller controls the panel to display an alert message different from the message before the support license is invalidated, and wherein the image forming apparatus further comprises a notifier that notifies a server that manages the support license of the software that the alert message has been displayed.

8. The image forming apparatus according to claim 1, wherein the license related to the software is a use license for the software.

9. The image forming apparatus according to claim 8, wherein the message is a message about an expiry date of the use license, or a message that prompts the user to renew the use license.

10. The image forming apparatus according to claim 9, wherein the display controller controls the panel to display a start button to start a procedure of the renewal of the use license.

11. The image forming apparatus according to claim 9, wherein the display controller controls the panel to display an alert message different from the message before the use license is invalidated, and wherein the image forming apparatus further comprises a notifier that notifies a server that manages the use license of the software that the alert message has been displayed.

12. The image forming apparatus according to claim 1, further comprising a license manager that manages the license related to the software based on the license management information.

13. An image forming apparatus comprising:

an image forming mechanism;

a panel serving as a user interface of the image forming mechanism;

means for receiving an image forming instruction for the image forming mechanism from a user of an information processing apparatus;

means for controlling the panel to display, in response to reception of the image forming instruction, a message about management of a license related to software installed in the information processing apparatus by referring to management information of the software, wherein the license is either a support license or a use license, and the use license and the support license are seperately managed; and means for managing a support license database and a use license database as the support license and the use license are seperately managed, wherein the support license allows a support staff member or an artificial intelligence (AI) to provide assistance to the users to install or operate the software, the use license allows users operating the software but does not involve providing assistance by the support staff or an AI to install or operate the software, and the support license and the use license have separate expiration dates.

14. The image forming apparatus of claim 1, wherein the support license is given to the user to receive the assistance by the support staff or artificial intelligence (AI) to install or operate the software, and the support license expires after the use license.

\* \* \* \* \*